United States Patent
Ashmore

(10) Patent No.: US 7,313,721 B2
(45) Date of Patent: Dec. 25, 2007

(54) APPARATUS AND METHOD FOR PERFORMING A PREEMPTIVE RECONSTRUCT OF A FAULT-TOLERANT RAID ARRAY

(75) Inventor: Paul Andrew Ashmore, Longmont, CO (US)

(73) Assignee: Dot Hill Systems Corporation, Carlsbad, CA (US)

( * ) Notice: Subject to any disclaimer, the term of this patent is extended or adjusted under 35 U.S.C. 154(b) by 465 days.

(21) Appl. No.: 10/911,110

(22) Filed: Aug. 4, 2004

(65) Prior Publication Data
US 2005/0283655 A1 Dec. 22, 2005

Related U.S. Application Data

(60) Provisional application No. 60/581,556, filed on Jun. 21, 2004.

(51) Int. Cl.
G06F 11/00 (2006.01)
(52) U.S. Cl. .......................................... 714/7
(58) Field of Classification Search ............... 714/7
See application file for complete search history.

(56) References Cited

U.S. PATENT DOCUMENTS

| | | |
|---|---|---|
| 5,379,411 A | 1/1995 | Morgan et al. |
| 5,495,572 A | 2/1996 | Tanaka et al. |
| 5,566,316 A | 10/1996 | Fechner et al. |
| 5,574,856 A | 11/1996 | Morgan et al. |
| 5,666,512 A | 9/1997 | Nelson et al. |
| 5,717,850 A | 2/1998 | Apperley et al. |
| 5,727,144 A * | 3/1998 | Brady et al. .................. 714/6 |
| 5,802,264 A | 9/1998 | Chen et al. |
| 5,815,650 A | 9/1998 | Apperley et al. |
| 5,832,199 A | 11/1998 | Apperley et al. |

(Continued)

FOREIGN PATENT DOCUMENTS

EP 0722141 7/1996

(Continued)

OTHER PUBLICATIONS http://www.hybinette.com/products/raids/z9200.htm; Zativa 9200 RAID Controller.

(Continued)

Primary Examiner—Michael C Maskulinski
(74) Attorney, Agent, or Firm—E. Alan Davis; James W. Huffman

(57) ABSTRACT

A RAID controller performs a preemptive reconstruct of a redundant array of disks while it is still fault-tolerant by determining the errors by a first disk exceeded the error threshold, and reading data from a second disk, and writing the data to a spare disk. The second disk's data is a mirrored copy of the first disk's data. The controller also replaces the first disk with the spare disk, after completing the reading and writing. Additionally, while performing the reading and writing, the controller writes second data to the first disk in response to a user write request including the second data, thereby maintaining the fault-tolerance of the redundant array. In another embodiment, the controller creates the data of the first disk from second data read from two or more of the other disks in the array and writes the created data to the spare disk.

10 Claims, 9 Drawing Sheets

U.S. PATENT DOCUMENTS

| | | | |
|---|---|---|---|
| 5,832,204 A | 11/1998 | Apperley et al. | |
| 5,889,938 A | 3/1999 | Tanaka et al. | |
| 5,941,993 A | 8/1999 | Tanaka et al. | |
| 6,000,039 A | 12/1999 | Tanaka et al. | |
| 6,161,194 A | 12/2000 | Tanaka et al. | |
| 6,223,252 B1 | 4/2001 | Bandera et al. | |
| 6,249,887 B1 | 6/2001 | Gray et al. | |
| 6,404,975 B1 | 6/2002 | Bopardikar et al. | |
| 6,598,174 B1 * | 7/2003 | Parks et al. | 714/6 |
| 6,625,748 B1 | 9/2003 | Tanaka et al. | |
| 6,732,233 B2 * | 5/2004 | Smith | 711/114 |
| 6,886,108 B2 * | 4/2005 | Talagala | 714/5 |
| 6,892,276 B2 * | 5/2005 | Chatterjee et al. | 711/114 |
| 2002/0162057 A1 | 10/2002 | Talagala | |
| 2005/0166084 A1 * | 7/2005 | Yagisawa et al. | 714/6 |

FOREIGN PATENT DOCUMENTS

| | | |
|---|---|---|
| EP | 0726521 | 8/1996 |

OTHER PUBLICATIONS http://unthought.net/Software-RAID.HOWTO/Software-RAID.HOWTO.html#toc6.

http://www.digidata.com/media/storm_controller.pdf. STORM F8 Turbo Disk Controller Module.

http://www.lisilogicstorage.com/pdf/tech_ov/5884_fc_tech_ov.pdf. Technical Overview 5884 FC Storage System, SAN Storage for Open Systems.

http://www.ariolic.com/activesmart.

http://www.netwind.com/html/intelli-smart.html; Netwind Learning Center.

http://www.kmint21.com/smart http://www.ariolic.com/activesmart/smart-technology.html.

http://www.disk-utility.com/disk_failure.html Downloaded Sep. 10, 2007.

* cited by examiner

Computer Network with RAID Controller

Preemptive Reconstruct of Redundant RAID Array

Preemptive Reconstruct of Redundant RAID Array (cont.)

Preemptive Reconstruct of Redundant RAID Array (Alternate Embodiment)

Preemptive Reconstruct of Redundant RAID Array (cont.)

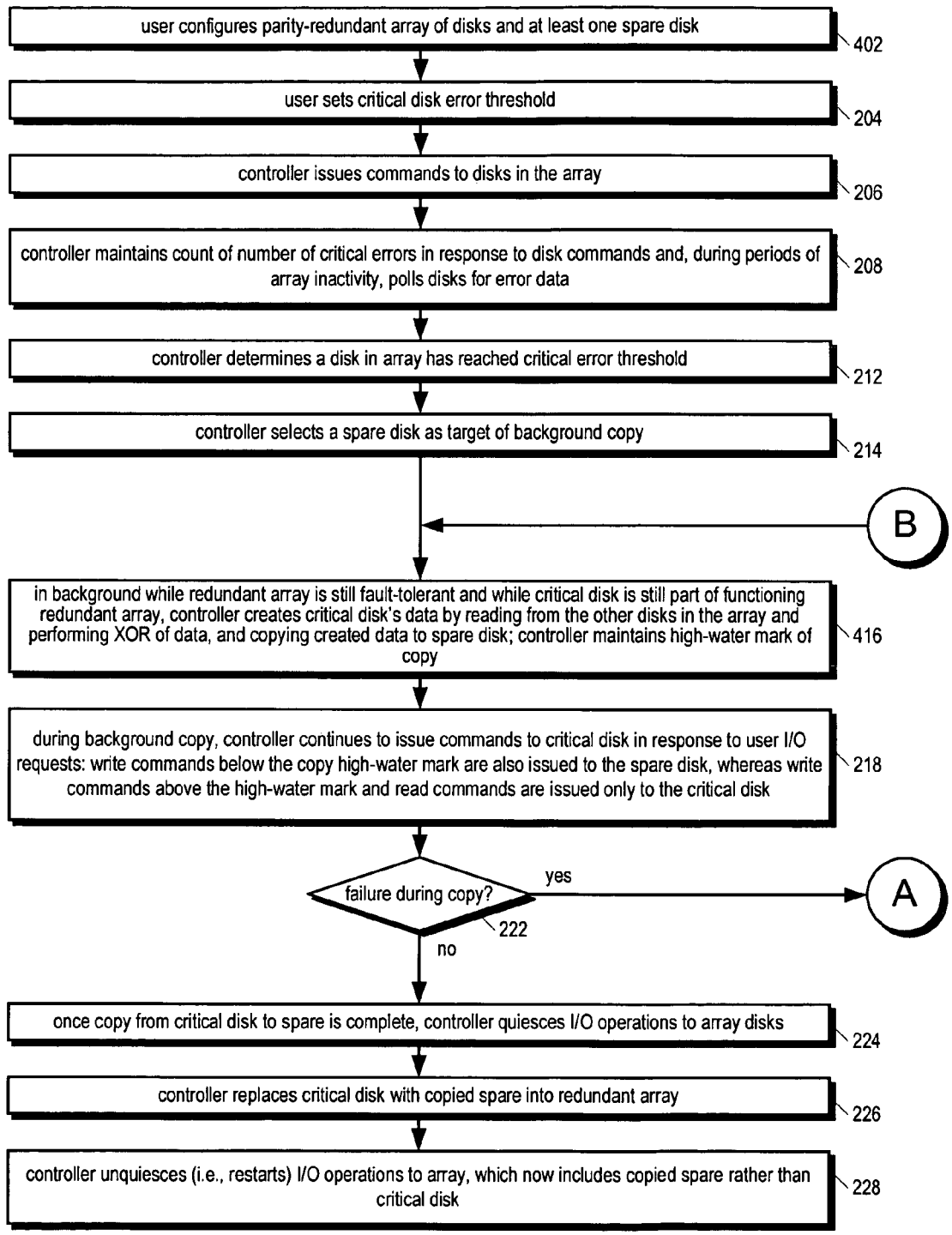

Preemptive Reconstruct of Redundant RAID Array (cont.)

APPARATUS AND METHOD FOR PERFORMING A PREEMPTIVE RECONSTRUCT OF A FAULT-TOLERANT RAID ARRAY

CROSS REFERENCE TO RELATED APPLICATION(S)

This application claims the benefit of the following U.S. Provisional Application which is incorporated herein by reference for all intents and purposes:

| Ser. No. | Filing Date | Title |
| --- | --- | --- |
| 60/581556 | Jun. 21, 2004 | PREEMPTIVE RECONSTRUCT FOR REDUNDANT RAID ARRAYS |

FIELD OF THE INVENTION

This invention relates in general to the field of redundant arrays of inexpensive disks (RAID) controllers and particularly to increasing the availability of data on arrays of storage devices controlled thereby.

BACKGROUND OF THE INVENTION

For many years computer systems have included disk controllers capable of striping data across a group, or array, of multiple physical disks such that the controller presents a single logical disk to the computer operating system. To illustrate the notion of striping, assume a striped array of four physical disks each having a capacity of 100 GB, and the array stripe size, or block size, is eight sectors, or 4 KB. In this example, the controller stores the first, fifth, ninth, etc. 4 KB block of the logical disk on the first, second, third, etc. group of eight sectors, respectively, on the first physical disk; the controller stores the second, sixth, tenth, etc. 4 KB block of the logical disk on the first, second, third, etc. group of eight sectors, respectively, on the second physical disk; the controller stores the third, seventh, eleventh, etc. 4 KB block of the logical disk on the first, second, third, etc. group of eight sectors, respectively, on the third physical disk; and the controller stores the fourth, eighth, and twelfth, etc. 4 KB block of the logical disk on the first, second, third, etc. group of eight sectors, respectively, on the fourth physical disk.

One advantage of striping is the ability to provide a logical disk with a larger storage capacity than is possible with the largest capacity individual physical disk. In the example above, the result is a logical disk having a storage capacity of 400 GB.

Perhaps a more important advantage of striping is the improved performance that a striped array can provide. The performance improvement in a random I/O environment—such as a multi-user fileserver, database, or transaction processing server—is mainly achieved by selecting a stripe size that causes a typical read I/O request from the server to statistically require only one disk in the array to be accessed. Consequently, each disk in the array may be seeking concurrently to a different cylinder each to satisfy a different I/O request, thereby taking advantage of the multiple spindles of the array. The performance improvement in a throughput-intensive environment—such as a video-on-demand server—is mainly achieved by selecting a stripe size that causes a typical read I/O request to span all the disks in the array so that the controller can read the disks in parallel and keep them all seeking to the same cylinder. In this environment, the spindles of the various disks in the array are often synchronized.

However, a problem with striped arrays of disks is that the reliability of the array taken as a whole is lower than the reliability of each of the single disks separately. This is because if the data stored on one disk becomes unavailable due to a failure of the disk, then from the computer's perspective all the data of the logical disk is unavailable, since it is unacceptable for the controller to return only part of the data. The reliability of disks is commonly measured in mean time between failure (MTBF). As the number of disks in a RAID 0 array increases, the MTBF decreases, perhaps to a level that is unacceptable in many applications.

To solve this problem, the notion of redundancy was introduced into arrays of disks. In a redundant array of disks, an additional, or redundant, disk is added to the array that does not increase the storage capacity of the logical disk, but instead enables redundant data to be stored on one or more of the disks of the array such that even if one of the disks in the array fails, the controller can still provide the requested data of the logical disk to the computer. For this reason, when an array is in a redundant state, i.e., when none of the disks of the array have failed, the array is said to be fault tolerant because it can tolerate one disk failure and still provide the user data. The predominant forms of redundant data are mirrored data and parity data. In many cases, the MTBF of a redundant array of disks may be greater than the MTBF of a single, non-redundant, disk.

RAID is an acronym for Redundant Arrays of Inexpensive Disks, which was coined in 1987 by Patterson, Gibson, and Katz of the University of California, Berkeley in their seminal paper entitled "A Case for Redundant Arrays of Inexpensive Disks (RAID)." The late 1980's witnessed the proliferation of RAID systems which have become the predominant form of mass storage for server-class computing environments. The original RAID paper defined five different forms of redundant arrays of disks, referred to as RAID levels 1 through 5. Others have been developed since then, and striped arrays have come to be referred to as RAID level 0. The various RAID levels and their relative performance and reliability characteristics are well-known in the art, but will be discussed here briefly for ease of understanding of the problems solved by the present invention.

RAID level 1 employs disk mirroring. A RAID 1 array consists of a pair of disks. Each time the computer issues a write to a RAID controller for a RAID 1 logical disk, the RAID controller writes the data to both of the disks in the pair in order to maintain mirrored copies of the data on the pair of disks. Each time the computer issues a read to the RAID controller for a RAID 1 logical disk, the RAID controller reads only one of the disks. If one disk in a RAID 1 array fails, data may be read from the remaining disk in the array. An extension of RAID 1 is RAID 10, which comprises an array of striped mirrored pairs of disks. RAID 10 provides the reliability benefits of RAID 1 and the performance benefits of RAID 0.

RAID level 4 employs striping with parity. A RAID 4 array requires at least three physical disks. Assume, for example, a four disk RAID 4 array with a stripe size of 4 KB. Three of the disks are data disks and the fourth disk is a parity disk. In this example, the controller stores the first, fourth, seventh, etc. 4 KB block of the logical disk on the first, second, third, etc. group of eight sectors, respectively, on the first data disk; the controller stores the second, fifth, eighth, etc. 4 KB block of the logical disk on the first, second, third, etc. group of eight sectors, respectively, on the second data disk; and the controller stores the third, sixth, ninth, etc. 4 KB block of the logical disk on the first, second, third, etc. group of eight sectors, respectively, on the third data disk. The controller stores the parity (binary XOR, or exclusive-OR) of the first 4 KB block of the three data disks onto the first 4 KB block of the parity disk, the binary XOR of the second 4 KB block of the three data disks onto the second 4 KB block of the parity disk, the binary XOR of the third 4 KB block of the three data disks onto the third 4 KB block of the parity disk, etc. Thus, any time the controller writes one or more of the data disks, the controller must calculate the parity of all the data in the corresponding blocks of all the data disks and write the parity to the corresponding block of the parity disk. When the controller reads data, it only reads from the data disks, not the parity disk.

If one of the data disks in the RAID 4 array fails, the data on the failed data disk can be recreated by reading from the remaining data disks and from the parity disk and binary XORing the data together. This is a property of binary XOR used to advantage in parity-redundant arrays of disks. This enables the RAID controller to return the user data to the computer even when a data disk has failed.

RAID level 5 is similar to RAID level 4, except that there is no dedicated parity disk. Instead, the parity disk is a different disk for each stripe in the array such that the parity is distributed across all disks. In particular, the parity disk is rotated for each stripe along the array. RAID level 5 improves write performance in a random I/O environment by eliminating the write bottleneck of the parity drive.

As may be observed from the foregoing, when a disk in a redundant array fails, the array is no longer fault-tolerant, i.e., it cannot tolerate a failure of a second disk. An exception to this rule is a RAID level that provides multiple redundancy, such as RAID level 6, which is similar to RAID 5, but provides two-dimensional parity such that a RAID 6 array can tolerate two disk failures and continue to provide user data. That is, a RAID 6 array having one failed disk is still fault-tolerant, although not fully redundant. Once two disks in a RAID 6 array have failed, the array is no longer fault-tolerant.

In order to restore a redundant array of disks from a non-fault-tolerant (or non-fully redundant) state to its fault-tolerant (or fully redundant) state, the array must be reconstructed. In particular, the data on the failed disk must be recreated and written to a new disk to be included in the array. For a parity-redundant array, recreating the data of the failed disk comprises reading the data from the remaining disks and binary-XORing the data together. For a mirrored-redundant array, recreating the data of the failed disk comprises simply reading the data from the failed disk's mirror disk. Once the RAID controller recreates the data, writes it to the new disk, and logically replaces the failed disk with the new disk into the array, the array is restored to fault-tolerance (or full redundancy), i.e., is reconstructed.

When a disk failure occurs, most RAID controllers notify a system administrator in some manner so that the administrator can reconstruct the redundant array. This may require the administrator to physically swap out the failed disk with a new disk and instruct the RAID controller to perform the reconstruct. Some RAID controllers attempt to reduce the amount of time a redundant array of disks is non-fault-tolerant (or not fully redundant) by automatically performing a reconstruct of the array in response to a disk failure. Typically, when the administrator initially configures the redundant arrays of the system, the administrator configures one or more spare disks connected to the RAID controller that the RAID controller can automatically use as the new disk for an array in the event of a disk failure.

Other RAID controllers have attempted to anticipate that a disk in an array will fail by detecting non-fatal errors generated by a disk, i.e., that do not cause a disk failure. The RAID controllers notify the system administrator that a disk is generating errors so that the administrator can initiate a reconstruct of the array. However, because the reconstruct removes the error-generating disk from the array to perform the reconstruct, the array is non-fault-tolerant (or not fully redundant) during the reconstruct period, which might be fatal in the event of the failure of another disk of the array during the reconstruct period.

Therefore, what is needed is a RAID controller that can take action to prevent an array having a disk that is anticipated to fail from entering a non-fault-tolerant state by performing a reconstruct of the array, but in a manner that enables the array to remain fault-tolerant (or fully redundant) during the reconstruct period.

BRIEF SUMMARY OF INVENTION

In one aspect, the present invention provides a RAID controller for performing a preemptive reconstruct of a redundant array of disks while the redundant array is still fault-tolerant, including a memory, for storing an error threshold, and a microprocessor, coupled to the memory. The microprocessor determines that a number of errors by one of the disks in the redundant array has exceeded the error threshold and reads data from a second one of the disks in the redundant array and write the data to a spare disk, in response to determining that the number of errors exceeded the error threshold. The data of the second one of the disks in the redundant array is a mirrored copy of data of the one of the disks. The microprocessor also replaces the one of the disks in the redundant array with the spare disk, after reading the data and writing the data to the spare disk is complete. The microprocessor also, while performing the reading and writing, writes second data to the one of the disks in the redundant array in response to a user write request including the second data, thereby maintaining the fault-tolerance of the redundant array.

In another aspect, the present invention provides a RAID controller for performing a preemptive reconstruct of a redundant array of disks while the redundant array is still fault-tolerant, including a memory, for storing an error threshold, and a microprocessor, coupled to the memory. The microprocessor determines that a number of errors by one of the disks in the redundant array has exceeded the error threshold and creates the data of the one of the disks from second data read from two or more of the other disks in the redundant array and write the created data to a spare disk, in response to determining that the number of errors exceeded the error threshold. The microprocessor also replaces the one of the disks in the redundant array with the spare disk, after creating the data and writing the created data to the spare disk is complete. The microprocessor also, while performing the creating and writing, writes third data to the one of the disks in the redundant array in response to a user write request including the third data, thereby maintaining the fault-tolerance of the redundant array.

In another aspect, the present invention provides a method for performing a preemptive reconstruct of a redundant array of disks while the redundant array is still fault-tolerant. The method includes determining that a number of errors by one of the disks in the redundant array has exceeded an error threshold. The method also includes reading data from a second one of the disks in the redundant array and writing the data to a spare disk, in response to determining that the error threshold has been exceeded. The data of the second one of the disks in the redundant array is a mirrored copy of data of the one of the disks. The method also includes replacing the one of the disks in the redundant array with the spare disk, after the reading and writing is complete. The method also includes writing second data to the one of the disks in the redundant array in response to a user write request including the second data while performing the reading and writing, thereby maintaining the fault-tolerance of the redundant array.

In another aspect, the present invention provides a method for performing a preemptive reconstruct of a redundant array of disks while the redundant array is still fault-tolerant. The method includes determining that a number of errors by one of the disks in the redundant array has exceeded an error threshold. The method also includes creating the data of the one of the disks from second data read from two or more of the other disks in the redundant array and writing the created data to a spare disk, in response to determining the error threshold was exceeded. The method also includes replacing the one of the disks in the redundant array with the spare disk, after the creating and writing is complete. The method also includes writing third data to the one of the disks in the redundant array in response to a user write request including the third data while performing the creating and writing, thereby maintaining the fault-tolerance of the redundant array.

An advantage of the present invention is that it reduces the likelihood of data loss of a redundant array of disks by not putting the array into a non-fault-tolerant state while performing a reconstruct, i.e., by keeping the array fault-tolerant during the preemptive reconstruct. Stated alternatively, the redundant array can tolerate a disk failure during the preemptive reconstruct without data loss, whereas during a conventional reconstruct an array cannot tolerate a disk failure without losing data. Additionally, with respect to a parity-redundant array, copying the data from the critical disk to the spare disk typically takes less time than a conventional reconstruct of a failed disk from the other disks in the array, since the copy involves a read of only one disk rather than a read of multiple disks and an exclusive-OR operation. Finally, in one embodiment, by automatically performing the preemptive reconstruct in response to the error threshold being reached, the time in which the critical disk is part of the array is reduced since the time for the user to receive notification, decide how to proceed, and initiate the preemptive reconstruct is eliminated. Additionally, the opportunity for user error is reduced.

DETAILED DESCRIPTION

Figure 1:
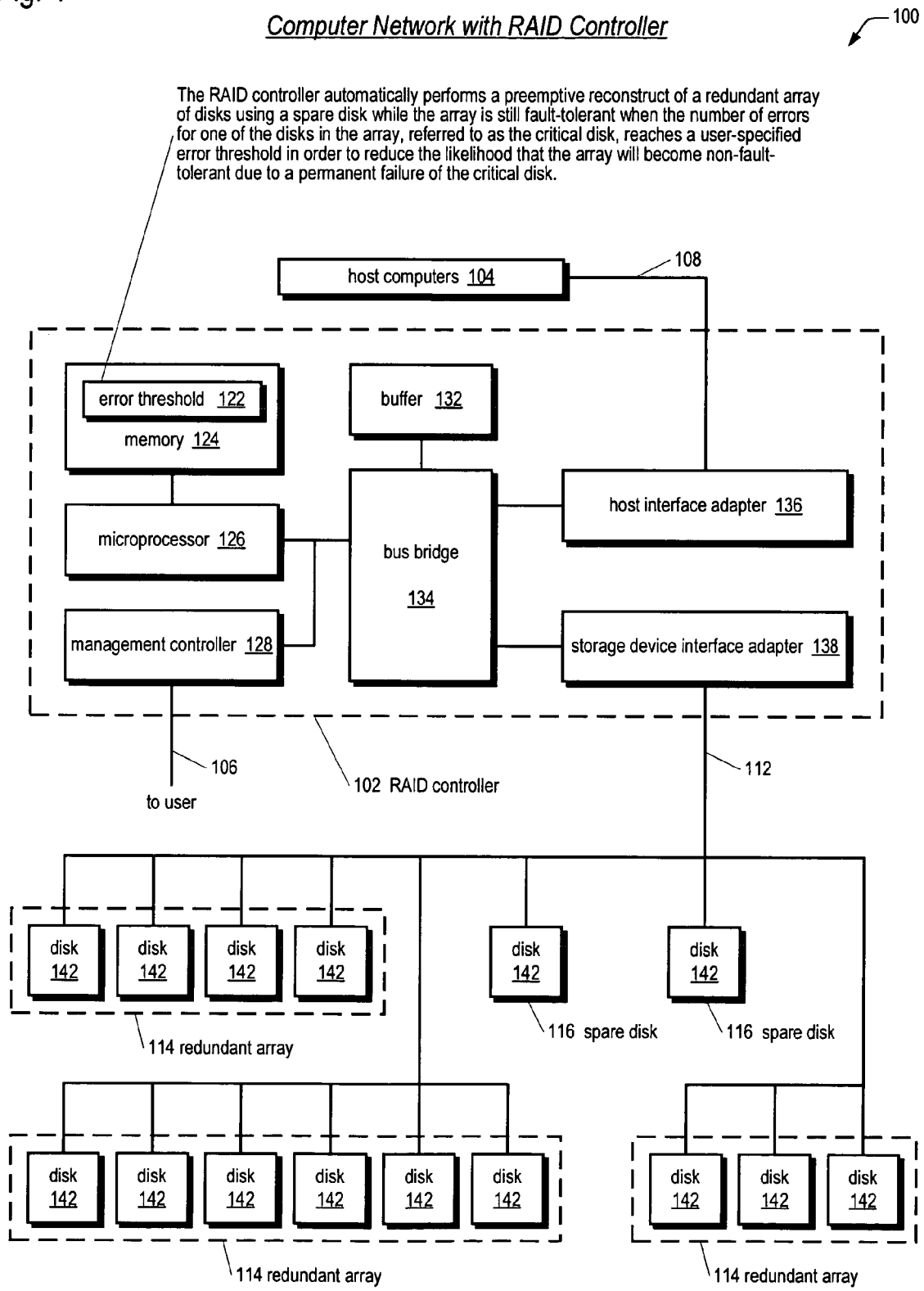
FIG. 1 is a computer network including a RAID controller according to the present invention.

Referring now to FIG. 1, a computer network 100 including a RAID controller 102 according to the present invention is shown. The network 100 includes one or more host computers 104 coupled to a RAID controller 102 and a plurality of disks 142, or disk drives 142, coupled to the RAID controller 102.

In one embodiment, the disks 142 comprise, but are not limited to, hard disk drives. However, the disks 142 may comprise, but are not limited to, any permanent storage device, such as tape drives or optical drives. The disks 142 are coupled to the RAID controller 102 via a storage device transport medium 112. The storage device transport medium 112 and the protocols performed on it may include, but are not limited to, FibreChannel (FC), Advanced Technology Attachment (ATA), Serial Advanced Technology Attachment (SATA), Small Computer Systems Interface (SCSI), Serial Attached SCSI (SAS), HIPPI, ESCON, FICON, Ethernet, Infiniband, or relevant combinations thereof. The disks 142 and RAID controller 102 may communicate using stacked protocols, such as SCSI over FibreChannel or Internet SCSI (iSCSI).

The disks 142 are grouped into redundant arrays 114. FIG. 1 illustrates three redundant arrays 114, one comprising four disks 142, one comprising three disks 142, and one comprising six disks 142. The redundant arrays 114 are configured according to any of well-known RAID levels, such as RAID level 1, 2, 3, 4, 5, 6, 10, or 50. Furthermore, the present invention is not limited to currently known RAID levels, but may also be employed with redundant arrays 114 of disks according to subsequently discovered RAID levels. Also, the invention may be employed with non-redundant arrays, such as RAID 0 arrays. Finally, the invention may be employed with redundant arrays, whether singly-redundant (i.e., arrays which can tolerate only a single disk failure), or multiply-redundant (i.e., arrays which can tolerate multiple disk failures) such as RAID 6 arrays.

A redundant array 114 of disks 142 is a plurality of disks 142 which the RAID controller 102 presents to the host computers 104 as a single logical disk. When a host computer 114 requests the RAID controller 102 to write user data to the logical disk, the RAID controller 102 writes the user data to one or more of the disks 142 of the redundant array and also writes redundant data to one or more other disks in the redundant array 114. The redundant data is typically a mirrored copy of the user data or parity data computed from the user data in some fashion, according to the various RAID levels. Writing the redundant data in addition to the user data enables the RAID controller 102 to subsequently provide the user data when the host computer 114 requests it, even if one of the disks 142 in the redundant array 114 has failed after the user data and redundant data have been written to the redundant array 114. In the case of a redundant array 114 based on mirroring, the RAID controller 102 simply reads the failed disk's 142 data from the failed disk's 142 mirror disk 142. In the case of a redundant array 114 based on parity, the RAID controller 102 reads the data stored on the non-failed disks 142 and computes the parity of the data to obtain the failed disk's 142 data.

In addition, some of the disks 142 are configured as spare disks 116. FIG. 1 illustrates two spare disks 116 connected to the RAID controller 102. A spare disk 116 is a disk 142 that is not part of a redundant array 114, but rather is available for the RAID controller 102 to automatically replace a disk 142 in a redundant array 114, either in the event of a conventional reconstruct in response to a failure of a disk 142 in a redundant array 114, or in the event of a preemptive reconstruct in response to a non-fatal disk 142 error.

The host computers 104 may include, but are not limited to workstations, personal computers, notebook computers, or personal digital assistants (PDAs), file servers, print servers, enterprise servers, mail servers, web servers, database servers, departmental servers, and the like. In the embodiment of FIG. 1, the host computers 104 are coupled to the RAID controller 102 via a host transport medium 108. The host transport medium 108 and the protocols performed on it may include, but are not limited to, FibreChannel (FC), Ethernet, Infiniband, TCP/IP, Small Computer Systems Interface (SCSI), HIPPI, Token Ring, Arcnet, FDDI, LocalTalk, ESCON, FICON, ATM, SAS, SATA, and the like, and relevant combinations thereof. RAID controller 102 receives I/O requests from the host computer 104 via the host transport medium 108 to transfer user data between the host computers 104 and the redundant arrays 114 of disks 142 via the host transport medium 108. The host transport medium 108 may be part of a network including links, switches, routers, hubs, directors, etc.

RAID controller 102 includes a memory 124, a microprocessor 126, a management controller 128, a buffer memory 132, a bus bridge 134, a host interface adapter 136, and a storage device interface adapter 138. In one embodiment, the host interface adapter 136, storage device interface adapter 138, and microprocessor 126 are each coupled to the bus bridge 134 by a corresponding local bus, as shown. In one embodiment, the local buses comprise a high speed local bus, including but not limited to a PCI, PCI-X, CompactPCI, or PCI Express bus. In one embodiment, the bus bridge 134 also includes a memory controller for controlling the buffer memory 132. In one embodiment, the buffer 132 and the bus bridge 134 are coupled by a double-data-rate (DDR) memory bus. The bus bridge 134 enables each of the microprocessor 126, host interface adapter 136, and storage device interface adapter 138 to communicate with one another and to transfer data to and from the buffer 132. In one embodiment, the microprocessor 126 comprises a Pentium III® microprocessor, and is coupled to the local bus by a second bus bridge, such as a bus bridge commonly referred to as a north bridge.

The microprocessor 126 is also coupled to memory 124 for storing program instructions and data for execution by the microprocessor 126. In particular, the memory 124 stores a critical disk error threshold 122, or error threshold 122, used in performing a preemptive reconstruct of a redundant array 114 as described herein. In one embodiment, the memory 124 stores an error threshold 122 specified for each of the disks 142 connected to the RAID controller 102. In one embodiment, a user specifies the error threshold 122. In another embodiment, the error threshold 122 is predetermined. Although FIG. 1 shows the error threshold 122 stored in the memory 124 coupled directly to the microprocessor 126, the error threshold 122 may be stored in any memory accessible by the RAID controller 102, such as the buffer 132, a memory coupled to the management controller 128, or on the disks 142.

In one embodiment, the management controller 128 comprises an Advanced Micro Devices® Elan™ microcontroller, and is coupled to the local bus by a third bus bridge, such as a bus bridge commonly referred to as a south bridge. In one embodiment, the management controller 128 also is coupled to a memory for storing program instructions and data for execution by the management controller 128. The management controller 128 is coupled to a management transport medium 106 for performing input and output with a user, such as a system administrator. The management transport medium 106 may include, but is not limited to, RS-232, Ethernet, FibreChannel, and Infiniband, and the like.

The management controller 128 receives user input for configuring and managing the RAID controller 102, and in particular may receive the error threshold 122. In another embodiment, the error threshold 122 is provided by the user via the host computers 104. In one embodiment, the management controller 128 receives input from the user via a serial interface such as an RS-232 interface. In one embodiment, the management controller 128 receives user input via an Ethernet interface and provides a web-based configuration and management utility. In addition to its configuration and management functions, the management controller 128 also performs monitoring functions, such as monitoring the temperature, presence, and status of critical components of the RAID controller 102, such as fans or power supplies, or of the disks 142.

The storage device interface adapter 138 is coupled to the storage device transport medium 112. In one embodiment, the storage device interface adapter 138 includes two ports for interfacing to two storage device transport mediums 112. The host interface adapter 136 is coupled to the host transport medium 108. In one embodiment, the host interface adapter 136 includes two ports for interfacing to two host transport mediums 108. The storage device interface adapter 138 interfaces the RAID controller 102 with the storage device transport medium 112. The storage device interface adapter 138 performs the protocol necessary to enable the redundant arrays 114, and in particular the disks 142 that comprise the redundant arrays 114, to communicate with the RAID controller 102. For example, in one embodiment, the storage device interface adapter 138 comprises a JNIC-1560 Milano dual channel Fibre Channel to PCI-X controller developed by the JNI Corporation™ that performs the Fibre Channel protocol for transferring Fibre Channel packets between the disks 142 and the RAID controller 102. In another embodiment, the storage device interface adapter 138 comprises an ISP2312 dual channel FibreChannel to PCI-X controller produced by the QLogic Corporation. The storage device interface adapter 138 includes a direct memory access controller (DMAC) for transferring data directly between the storage device transport medium 112 and the buffer 132 via the bus bridge 134.

The host interface adapter 136 interfaces the RAID controller 102 with the host transport medium 108. The host interface adapter 136 performs the protocol necessary to enable the hosts 104 to communicate with the RAID controller 102. For example, in one embodiment, the host interface adapter 136 comprises a JNIC-1560 Milano dual channel Fibre Channel to PCI-X controller that performs the Fibre Channel protocol for transferring Fibre Channel packets between the host computers 104 and the RAID controller 102, and in another embodiment the host interface adapter 136 comprises a QLogic ISP2312. The host interface adapter 136 includes a direct memory access controller (DMAC) for transferring data directly between the host transport medium 108 and the buffer 132 via the bus bridge 134.

The microprocessor 126 receives host computer 104 I/O requests from the host interface adapter 136 and processes the requests. Processing the requests may include various functions. For example, the logical block number and number of blocks of data to be transferred that is specified in the I/O request of the redundant array 114 to which data is to be written does not correspond to the appropriate physical block numbers and number of blocks on the disks 142 comprising the redundant array 114. Therefore, the logical block number specified in the host I/O request must be translated into the appropriate physical block number, number of blocks, and disk 142 be used in performing one or more data transfers between the RAID controller 102 and the disks 142 comprising the redundant array 114. This translation function is performed by the microprocessor 126. In one embodiment, the microprocessor 126 performs the translation according to well-known RAID techniques. After performing the translation, the microprocessor 126 programs the storage device interface adapter 138 to perform the data transfers between the disks 142 and the buffer 132. Additionally, the microprocessor 126 programs the host interface adapter 136 to perform data transfers between the host computers 104 and the buffer 132. Thus, when processing a host I/O request to write data from a host computer 104 to a redundant array 114, the microprocessor 126 programs the host interface adapter 136 to transfer data from the host computer 104 to the buffer 132; after the data is received into the buffer 132, the microprocessor 126 programs the storage device interface adapter 138 to transfer the data from the buffer 132 to the translated appropriate physical block numbers of the disks 142 comprising the redundant array 114. Conversely, when processing a host I/O request to read data from a redundant array 114 to a host computer 104, the microprocessor 126 programs the storage device interface adapter 138 to transfer the data to the buffer 132 from the translated appropriate physical block numbers of the disks 142 comprising the redundant array 114; after the data is received into the buffer 132, the microprocessor 126 programs the host interface adapter 136 to transfer the data to the host computer 104 from the buffer 132. The microprocessor 126 also performs the function of managing allocation of portions of the buffer 132 for performing the data transfers. In one embodiment, the microprocessor 126 also manages the buffer 132 as a cache memory for caching portions of the data buffered in buffer 132 in order to improve I/O performance between the redundant arrays 114 and the host computers 104 according to well-known caching techniques. In one embodiment, the microprocessor 126 performs exclusive-OR operations of the data required in certain RAID levels that employ parity data as the redundant data, such as RAID level 5, for example. In one embodiment, the microprocessor 126 programs a dedicated exclusive-OR circuit to perform the exclusive-OR operation on the user data to generate the redundant parity data.

In one embodiment, the microprocessor 126, buffer 132, bus bridge 134, and management controller 128 are comprised in a first circuit board which is coupled via a local bus backplane to a second circuit board comprising the host interface adapter 136 and storage device interface adapter 138. In another embodiment, the management controller 128 is comprised on a separate circuit board than a circuit board including the other elements of RAID controller 102. In one embodiment, the local bus backplane is passive and hot-pluggable.

The RAID controller 102 shown in FIG. 1 may be a stand-alone RAID controller networked to the host computers 104, for example, for providing network attached storage (NAS) or as part of a storage area network (SAN). However, the invention is not limited to stand-alone RAID controllers 102. Rather, the RAID controller 102 may be coupled to the host computer 104 in other ways, including but not limited to the alternate embodiments illustrated in FIGS. 5 and 6.

Advantageously, the RAID controller 102 is configured to perform a preemptive reconstruct of a redundant array 114 that has a disk 142 that may be about to fail, but performs the reconstruct while the redundant array 114 is still fault-tolerant, i.e., while the about-to-fail disk is still included and operational in the redundant array 114. According to one embodiment, generally speaking, a preemptive reconstruct includes the RAID controller 102 determining that one of the disks 142 in the redundant array 114 (the "critical disk") has a probability of failing that exceeds a user-defined threshold based on the error threshold 122, in response copying the data from the critical disk 142 to a spare disk 116, and replacing the critical disk 142 with the spare disk 116 in the redundant array 114 after the copy has completed. While the RAID controller 102 is copying the data from the critical disk 142 to the spare disk 116, the RAID controller 102 continues to write user data to the critical disk in response to user I/O requests. If the user data is written to a location of the spare disk 116 that was already copied to from the critical disk 142 (e.g., below a high-water mark), the RAID controller 102 also writes the user data to the spare disk 116.

Figure 2A:
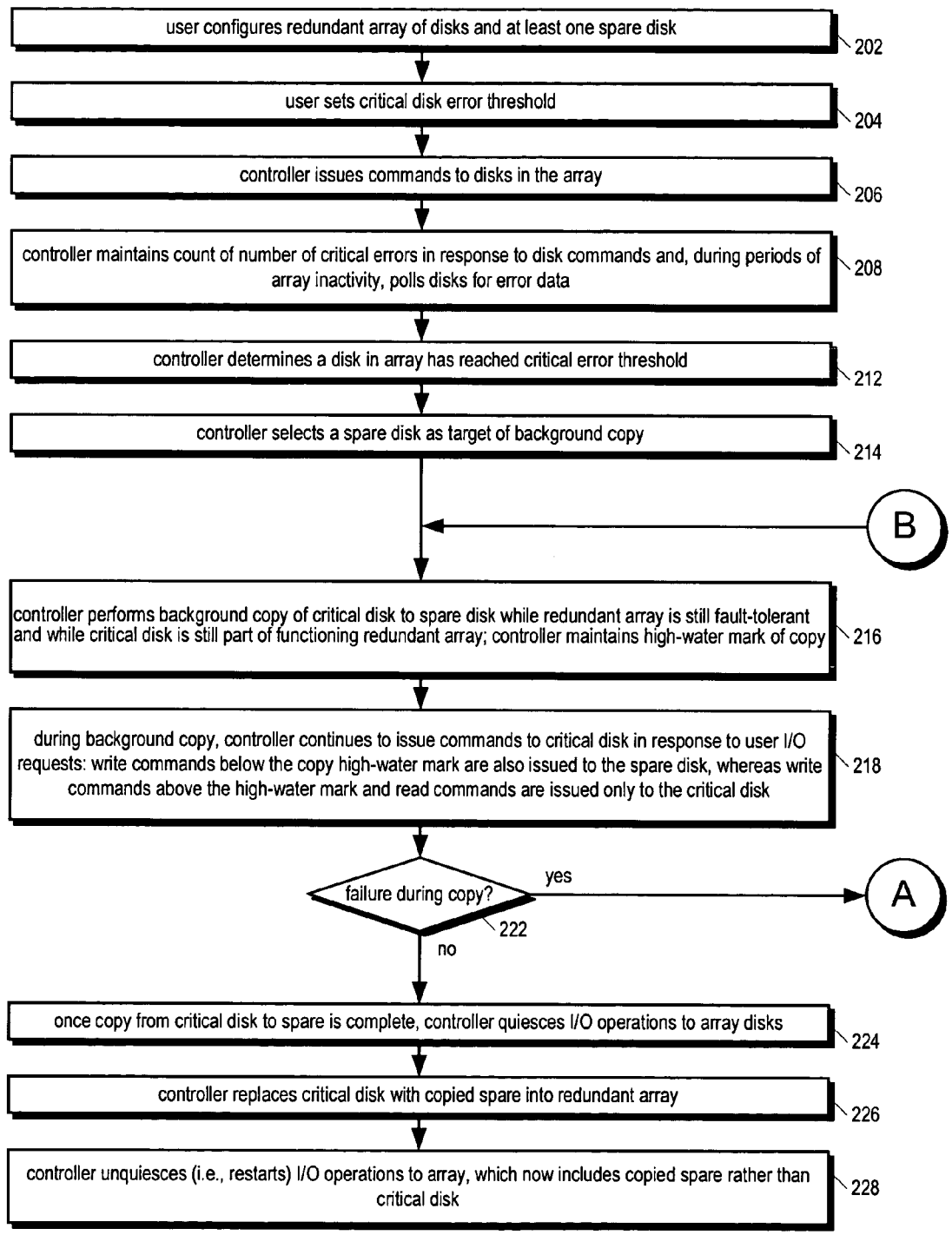
FIG. 2 is a flowchart illustrating the operation of the RAID controller of FIG. 1 to perform a preemptive reconstruct of a redundant array according to the present invention.
Figure 2B:
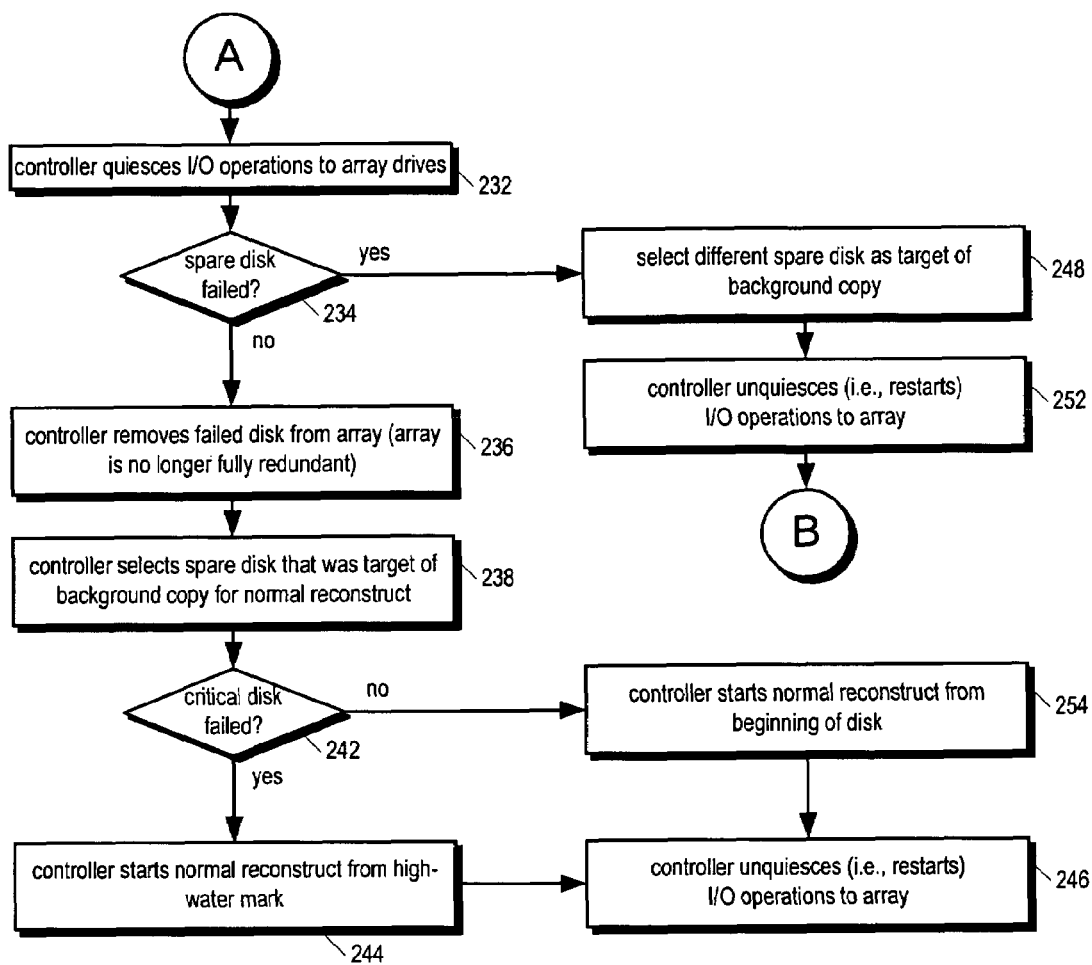

Referring now to FIG. 2, a flowchart illustrating the operation of the RAID controller 102 of FIG. 1 to perform a preemptive reconstruct of a redundant array 114 according to the present invention is shown. Flow begins at block 202.

At block 202, a user configures a redundant array 114 of disks 142 and at least one spare disk 116 of FIG. 1. In one embodiment, configuring the redundant array 114 comprises specifying the RAID level of the redundant array 114 and the number of disks 142 and/or storage capacity of the redundant array 114. In one embodiment, configuring at least one spare disk 116 comprises specifying the number of spare disks 116 for the RAID controller 102 to make available for reconstructing a redundant array 114 from among the available disks 142. In one embodiment, each spare disk 116 is allocated specifically for a particular redundant array 114; whereas in another embodiment, the spare disks 116 are allocated at large for use in any redundant array 114 needing a spare disk 116. Flow proceeds to block 204.

At block 204, the user specifies the error threshold 122 of FIG. 1, and the RAID controller 102 stores the error threshold 122. In one embodiment, a critical error is a correctable error or an uncorrectable error due to a media fault. A correctable error is an error which the disk 142 incurred when attempting to read or write to its media, but which the disk 142 was able to correct, such as by retrying the operation or by remapping the sector that caused the error to another sector, such as a spare sector on the disk's 142 media. In one embodiment, the disk 142 reports a correctable error by returning a CHECK CONDITION status and a SCSI sense key of RECOVERRED ERROR (0x01) as defined by the SCSI specification. An uncorrectable error due to a media fault is an error which the disk 142 incurred when attempting to read or write to its media and which the disk 142 was not able to correct. In one embodiment, the disk 142 reports a correctable error by returning a CHECK CONDITION status and a SCSI sense key of MEDIUM ERROR (0x03). Typically, the RAID controller 102 is able to correct for an uncorrectable error due to a media fault by remapping the sector that caused the error, either by explicitly instructing the disk 142 to remap the sector, or by the RAID controller 102 itself reserving spare sectors on the disk 142 and performing the remap using the reserved spare sectors. The SCSI error codes are given by way of example to illustrate a manner in which a disk 142 may report a critical error. However, the invention is not limited to a particular disk 142 protocol or manner of reporting the critical errors, but may be employed with various protocols. In one embodiment, the error threshold 122 may comprise a combination of a plurality of error thresholds. For example, the user may specify a threshold 122 for the number of correctable errors and a separate threshold 122 for the number of uncorrectable errors due to a media fault, as discussed below with respect to block 212. Flow proceeds to block 206.

At block 206, the RAID controller 102 issues read and write commands to the disks 142 in the redundant array 114 in response to I/O requests from the host computers 104. That is, the RAID controller 102 performs normal operations to the redundant array 114. Flow proceeds to block 208.

At block 208, while the RAID controller 102 is performing normal operations to the redundant array 114, the RAID controller 102 also maintains a count of the number of critical errors incurred in response to the read and write commands issued to the disks 142. In one embodiment, the RAID controller 102 maintains separate counts of correctable errors and uncorrectable errors due to a media fault reported by the disks 142. In addition, during periods of inactivity, e.g., when the disks 142 of the redundant array 114 are not being read or written in response to user I/O requests, the RAID controller 102 polls each of the disks 142 for information regarding critical error counts. Most disks maintain industry standard Self-Monitoring, Analysis and Reporting Technology (SMART) data, which includes critical error counts. In one embodiment, polling the disks for error data comprises polling the disks for SMART data. Flow proceeds to block 212.

At block 212, the RAID controller 102 determines that the number of critical errors for a disk 142 in the redundant array 114, referred to as the critical disk 142, has reached its critical error threshold 122 either in response to a normal read or write command or in response to polling for critical error information according to block 208. In one embodiment, the RAID controller 102 may determine that the critical disk 142 has reached its critical error threshold 122, thereby triggering a preemptive reconstruct, when the sum of the number of correctable errors and uncorrectable errors due to a media fault reaches the error threshold 122. In one embodiment, the RAID controller 102 may determine that the critical disk 142 has reached its critical error threshold 122, thereby triggering a preemptive reconstruct, either when the critical disk 142 generates a number of correctable errors that reaches a correctable error threshold 122, or when the critical disk 142 generates a number of uncorrectable errors due to a media fault that reaches an uncorrectable error due to a media fault threshold 122, or when it has reached both. Flow proceeds to block 214.

At block 214, the RAID controller 102 selects one of the spare disks 116 to be the target of a background copy as part of an automatic preemptive reconstruct. Flow proceeds to block 216.

At block 216, the RAID controller 102 performs a background copy of the data on the critical disk 142 to the spare disk 116 selected in block 214. The RAID controller 102 performs the copy while the redundant array 114 is still fault-tolerant and while the critical disk 142 is still part of the functioning redundant array 114, i.e., while the RAID controller 102 is still reading and writing the critical disk 142 in response to user I/O requests. In one embodiment, the RAID controller 102 begins reading the data from a location at the beginning of the critical disk 142 and writing the data to the corresponding location on the spare disk 116, and proceeds sequentially to the end of the critical disk 142 and spare disk 116. As the RAID controller 102 sequentially copies the data, it maintains a high-water mark of the copy. That is, the high-water mark is the location of the last data copied from the critical disk 142 to the spare disk 116. Flow proceeds to block 218.

At block 218, as mentioned in block 216, during the background copy the RAID controller 102 continues to issue read and write commands to the critical disk 142 in response to normal user I/O requests. If a write command is to a location on the critical disk 142 that corresponds to a location on the spare disk 116 that has already been written to as part of the background copy, then the RAID controller 102 also writes the user data to the spare disk 116; otherwise, the RAID controller 102 only writes the user data to the critical disk 142 since the user data will eventually be copied to the spare disk 142 via the background copy according to block 216. In one embodiment, if the write command is to a location below the high-water mark, then the RAID controller 102 also writes the user data to the spare disk 116; otherwise, the RAID controller 102 only writes to the critical disk 142. Read commands are only issued to the critical disk 142, not to the spare disk 116. Flow proceeds to decision block 222.

At decision block 222, the RAID controller 102 determines whether a disk 142 failed during the background copy of block 216. A disk failure may comprise any of various conditions, including, but not limited to the following. A disk 142 failure may include a permanent failure, i.e., a failure in which the disk 142 can no longer be read and written. A disk 142 failure may include an error generated by the disk 142 that the disk 142 cannot recover from and which the RAID controller 102 cannot recover from, such as by remapping a bad sector reported by the disk 142. A disk 142 failure may include a condition in which the disk 142 does not respond to a command after a predetermined time, i.e., a command timeout. A disk 142 failure may include a condition in which the disk 142 provides an error code indicating a hardware error, such as a SCSI sense key of NOT READY or HARDWARE ERROR or a SATA drive not ready condition (RDY not set), write fault condition (WFT set), data address mark not found condition (NDAM bit set), track 0 not found condition (NTKO bit set), ID not found condition (IDNF bit set), or sector marked bad by host condition (BBK bit set). A disk 142 failure may include a condition in which the disk 142 provides an error code indicating the command was aborted after the command has already been retried, such as a SCSI sense key of ABORTED COMMAND (0x0B) or a SATA command abort condition (ABRT bit set). A disk 142 failure may include a condition in which the disk 142 provides an error code indicating a media error a predetermined number of times, such as a SCSI MEDIUM ERROR sense key or a SATA uncorrectable data condition (UNC bit set). A disk 142 failure may include a user removing the disk 142 from the redundant array 114 either physically or logically via software control. If a disk 142 has failed during the background copy, flow proceeds to block 232; otherwise flow proceeds to block 224.

At block 224, once the background copy of block 216 from the critical disk 142 to the spare disk 116 is complete, the RAID controller 102 quiesces I/O operations to the disks 142 in the redundant array 114. That is, the RAID controller 102 completes all outstanding read or write commands to the disks 142 of the redundant array 114 and queues up I/O requests received from the host computers 104, rather than issuing reads and writes to the disks 142 in response to the I/O requests. In one embodiment, the RAID controller 102 may continue to perform I/O operations for other redundant arrays 114, i.e., for redundant arrays 114 other than the redundant array 114 including the critical disk 142. Flow proceeds to block 226.

At block 226, the RAID controller 102 replaces the critical disk 142 in the redundant array 114 with the spare disk 116 that now has a copy of the data from the critical disk 142. That is, the RAID controller 102 logically removes the critical disk 142 from the redundant array 114 and includes the spare disk 116 in the redundant array 114, such that the queued up I/O requests and any subsequent I/O requests will be converted to reads and writes to the spare disk 116 (which is no longer a spare disk 116 but is now part of the redundant array 114) rather than to the critical disk 142 (which is no longer part of the redundant array 114). Flow proceeds to block 228.

At block 228, the RAID controller 102 unquiesces I/O operations to the redundant array 114. That is, the RAID controller 102 begins issuing read and write commands to the disks 142 of the redundant array 114 in response to the queued up I/O requests and any subsequent I/O requests, and in particular issues reads and writes to the spare disk 116 that was the target of the background copy (which is no longer a spare disk 116 but is now part of the redundant array 114) and does not issue reads or writes to the critical disk 142 (which is no longer part of the redundant array 114). Flow ends at block 228.

At block 232, because the RAID controller 102 detects at decision block 222 that a disk 142 failure has occurred during the background copy, the RAID controller 102 quiesces I/O operations to the redundant array 114. Flow proceeds to decision block 234.

At decision block 234, the RAID controller 102 determines whether it was the spare disk 116 that failed. If so, flow proceeds to block 248; otherwise, flow proceeds to block 236.

At block 236, because one of the disks 142 of the redundant array 114 has failed, the RAID controller 102 removes the failed disk 142 from the redundant array 114. Consequently, in the case of a singly redundant array, such as a RAID level 1, 2, 3, 4, 5, 10, or 50 array, the redundant array 114 is no longer fault-tolerant. In the case of a multiply-redundant array, such as a RAID level 6 array, the redundant array 114 may still be fault-tolerant, but not fully redundant. Flow proceeds to block 238.

At block 238, the RAID controller 102 selects the spare disk 116 that was the target of the background copy of block 216 for a normal reconstruct, i.e., a reconstruct of the data on the failed disk 142 by reading the data of one or more of the remaining disks 142 in the redundant array 114, which is no longer fully redundant, and in the case of an originally singly redundant array 114 is no longer fault-tolerant. Flow proceeds to decision block 242.

At decision block 242, the RAID controller 102 determines whether the disk 142 that failed in the background copy was the critical disk 142. If so, flow proceeds to block 244; otherwise, flow proceeds to block 254.

At block 244, the RAID controller 102 begins a normal reconstruct of the redundant array 114 from the high-water mark of the background copy. That is, the RAID controller 102 begins reading the remaining disks 142 in the array 114 at the high-water mark, reconstructing the data on the failed disk 142, and writing the reconstructed data to the spare disk 116 at the high-water mark. Because block 244 is reached because it was the critical disk 142 that failed during the background copy, only the data above the high-water mark needs to be reconstructed. Advantageously, this provides a faster reconstruct than if a normal reconstruct of the entire spare disk 116 were required. Eventually, once the RAID controller 102 reconstructs the entire spare disk 116, such as after block 246, the RAID controller 102 will add the spare disk 116 to the redundant array 114. Flow proceeds to block 246.

At block 246, the RAID controller 102 unquiesces I/O operations to the array 114. While the normal reconstruct is being performed, I/O write operations are performed by writing to the spare disk 116 being reconstructed as part of the array 114, and I/O read operations are performed by reading from one or more of the remaining disks 142 of the original redundant array 114 and, in the case of parity redundant arrays 114, reconstructing the data for provision to the host computer 104. Flow ends at block 246.

At block 248, because the spare disk 116 failed, the RAID controller 102 selects a different spare disk 116 as the target of a background copy related to a future preemptive reconstruct. In one embodiment, the controller 102 automatically selects a different spare disk 116 from a pool of spare disks 116 previously allocated by the user. In one embodiment, the user selects a different spare disk 116. If no spare disks 116 are available, the user is prompted to connect a new spare disk 116 to the RAID controller 102. Flow proceeds to block 252.

At block 252, the RAID controller 102 unquiesces I/O operations to the redundant array 114. Flow returns to block 216 to perform the background copy of another attempt at a preemptive reconstruct.

At block 254, the RAID controller 102 begins a normal reconstruct of the redundant array 114 from the beginning of the spare disk 116. That is, the RAID controller 102 begins reading the remaining disks 142 in the array 114 at their beginning, reconstructing the data on the failed disk 142, and writing the reconstructed data to the spare disk 116 at the beginning. Because block 244 is reached because it was not the critical disk 142 that failed during the background copy, all the data of the failed disk 142 needs to be reconstructed. Eventually, once the RAID controller 102 reconstructs the entire spare disk 116, such as after block 246, the RAID controller 102 will add the spare disk 116 to the redundant array 114. Flow proceeds to block 246.

Figure 3A:
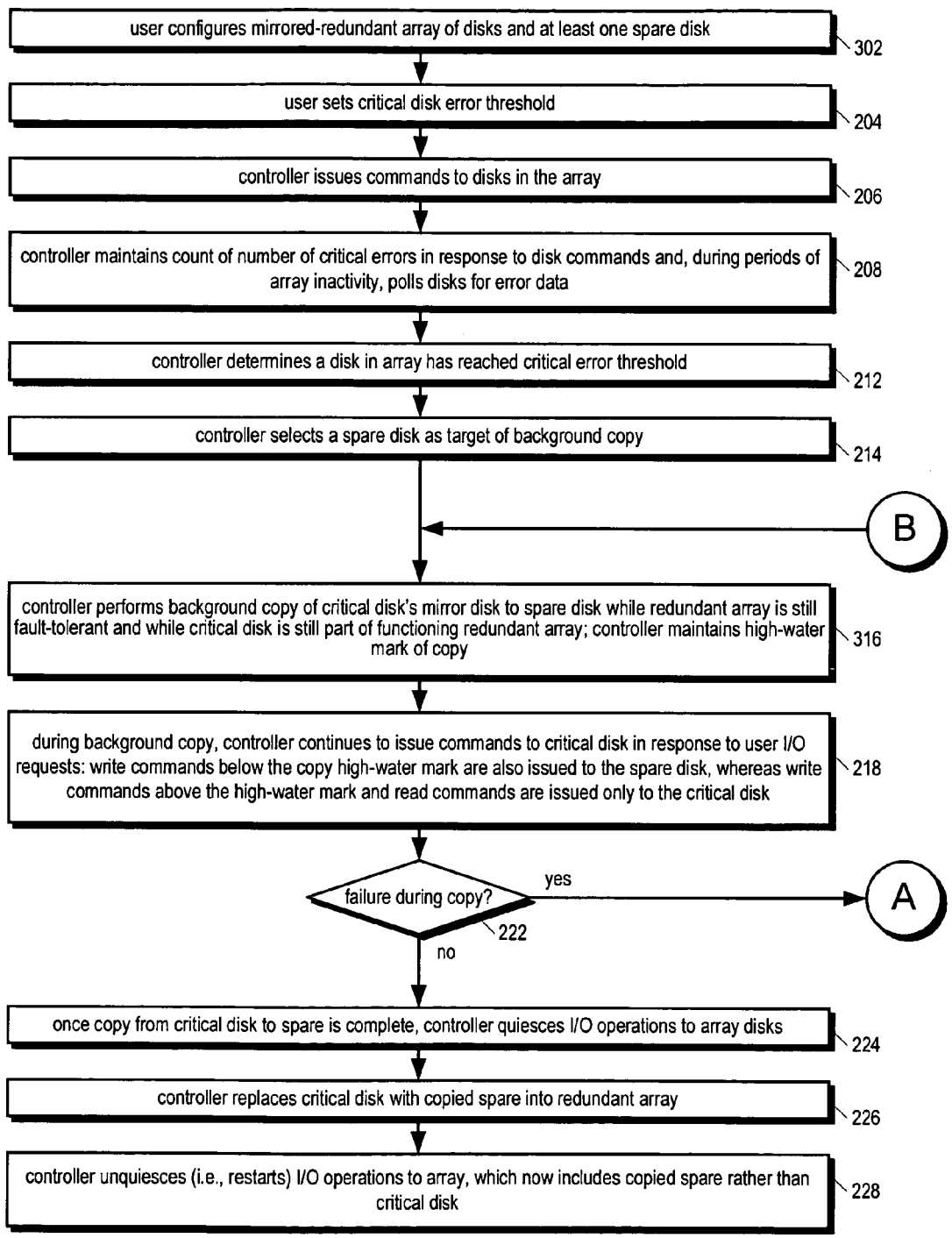
FIG. 3 is a flowchart illustrating the operation of the RAID controller of FIG. 1 to perform a preemptive reconstruct of a redundant array according to an alternate embodiment of the present invention.
Figure 3B:
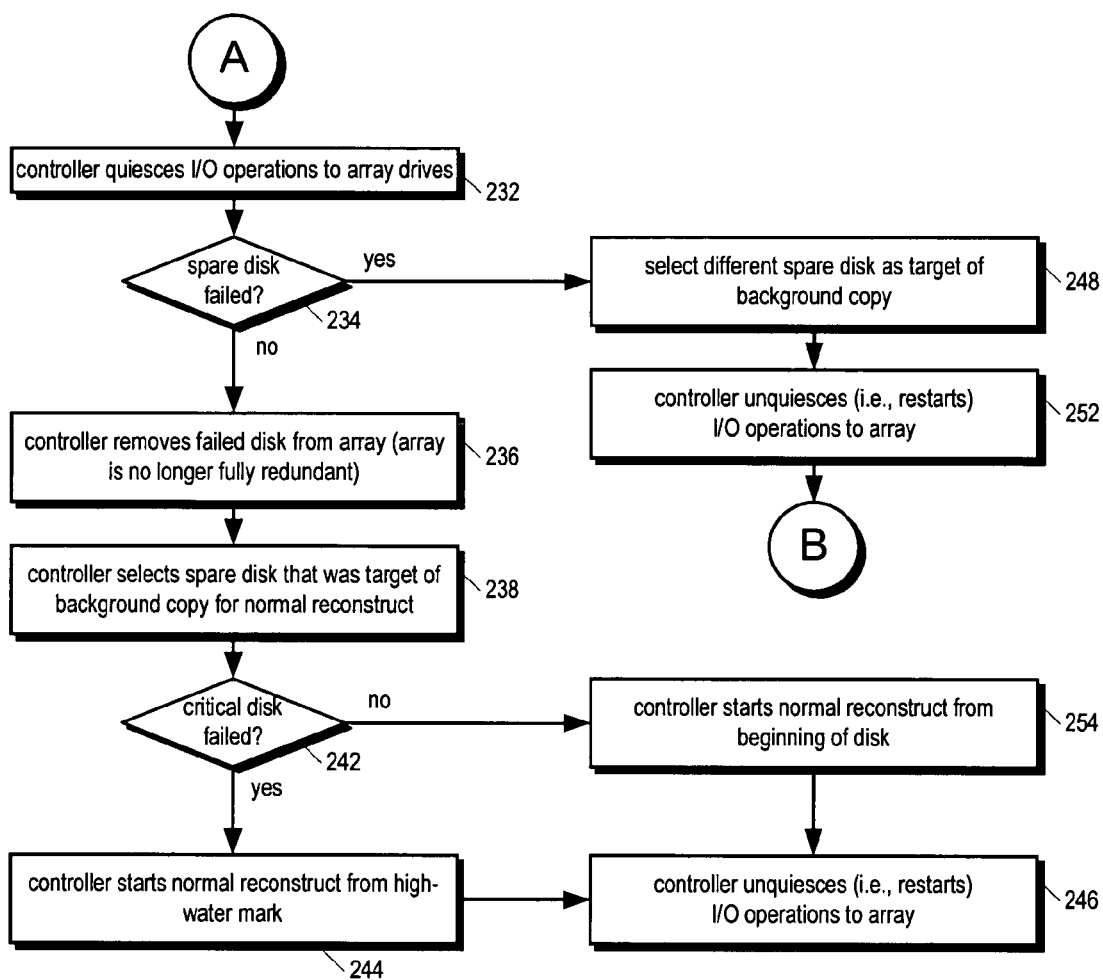

Referring now to FIG. 3, a flowchart illustrating the operation of the RAID controller of FIG. 1 to perform a preemptive reconstruct of a redundant array according to an alternate embodiment of the present invention is shown. FIG. 3 is similar to FIG. 2 and like number elements are alike. However, FIG. 3 includes block 302 replacing block 202 and block 316 replacing block 216.

At block 302, the user configures specifically a mirrored-redundant array 114 of disks 142, including but not limited to a RAID 1 or RAID 10 redundant array 114, and at least one spare disk 116 of FIG. 1.

At block 316, rather than performing a copy of the data on the critical disk 142 to the spare disk 116 as in block 216 of FIG. 2, the RAID controller 102 performs a background copy of the data on the critical disk's 142 mirror disk 142 to the spare disk 116 selected in block 214.

In other respects FIG. 3 is similar to FIG. 2. As may be observed, a potential advantage of the embodiment of FIG. 3 over the embodiment of FIG. 2 is that it reduces accesses to the critical disk 142, which may already be close to failure, during the preemptive reconstruct, thereby potentially reducing the probability of failure of the critical disk 142.

Figure 4B:
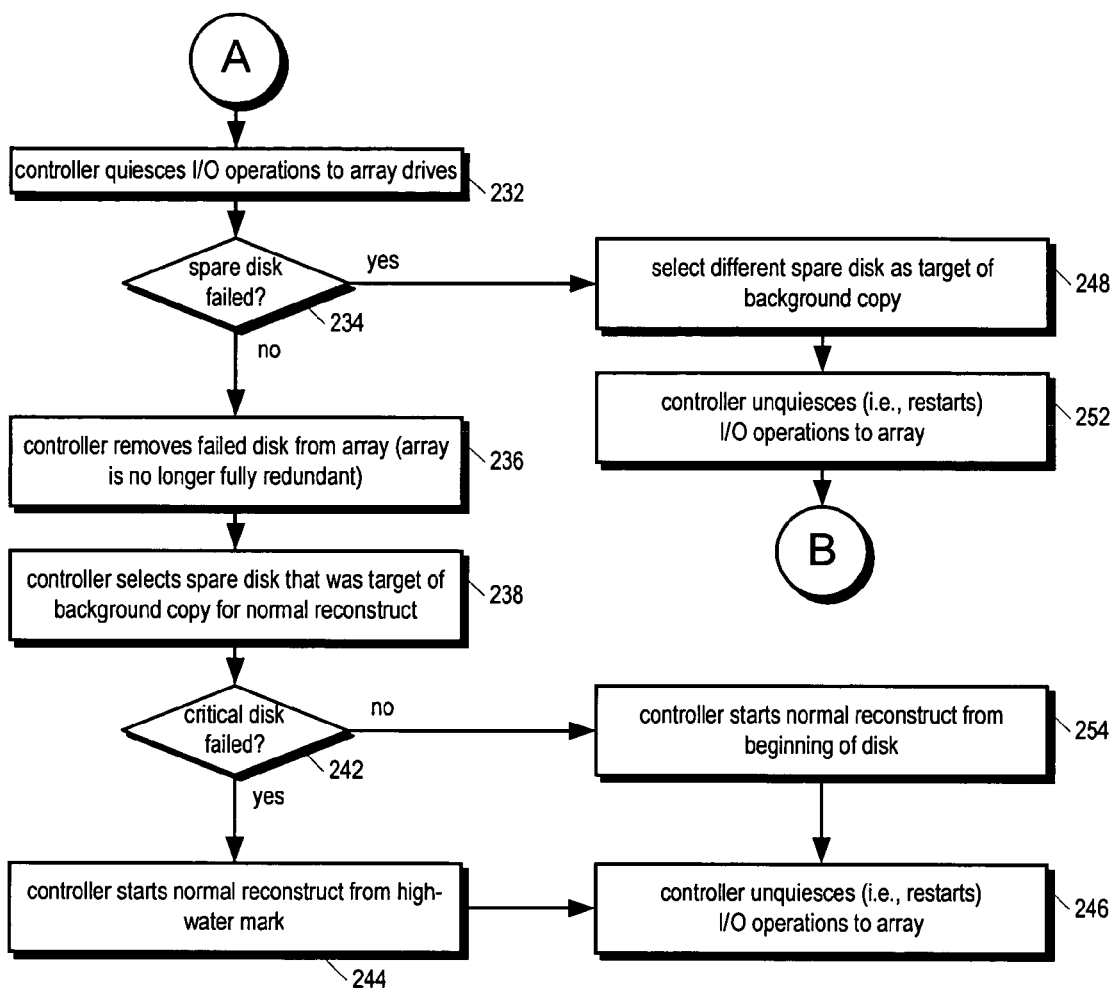
FIG. 4 is a flowchart illustrating the operation of the RAID controller of FIG. 1 to perform a preemptive reconstruct of a redundant array according to an alternate embodiment of the present invention.

Referring now to FIG. 4, a flowchart illustrating the operation of the RAID controller of FIG. 1 to perform a preemptive reconstruct of a redundant array according to an alternate embodiment of the present invention is shown. FIG. 4 is similar to FIG. 2 and like number elements are alike. However, FIG. 4 includes block 402 replacing block 202 and block 416 replacing block 216.

At block 402, the user configures specifically a parity-redundant array 114 of disks 142, including but not limited to a RAID 3, 4, 5, 6, or 50 redundant array 114, and at least one spare disk 116 of FIG. 1.

At block 416, rather than performing a copy of the data on the critical disk 142 to the spare disk 116 as in block 216 of FIG. 2, the RAID controller 102 reads data from the other disks 142 in the redundant array 114 and XORs the data to create the critical disk's 142 data, and writing the created data to the spare disk 116 selected in block 214.

In other respects FIG. 4 is similar to FIG. 2. As may be observed, a potential advantage of the embodiment of FIG. 4 over the embodiment of FIG. 2 is that it reduces accesses to the critical disk 142, which may already be close to failure, during the preemptive reconstruct, thereby potentially reducing the probability of failure of the critical disk 142. It is noted that in this embodiment, the preemptive reconstruct may take longer than the embodiments that copy from the critical disk 142 or from the mirrored disk 142.

Figure 5:
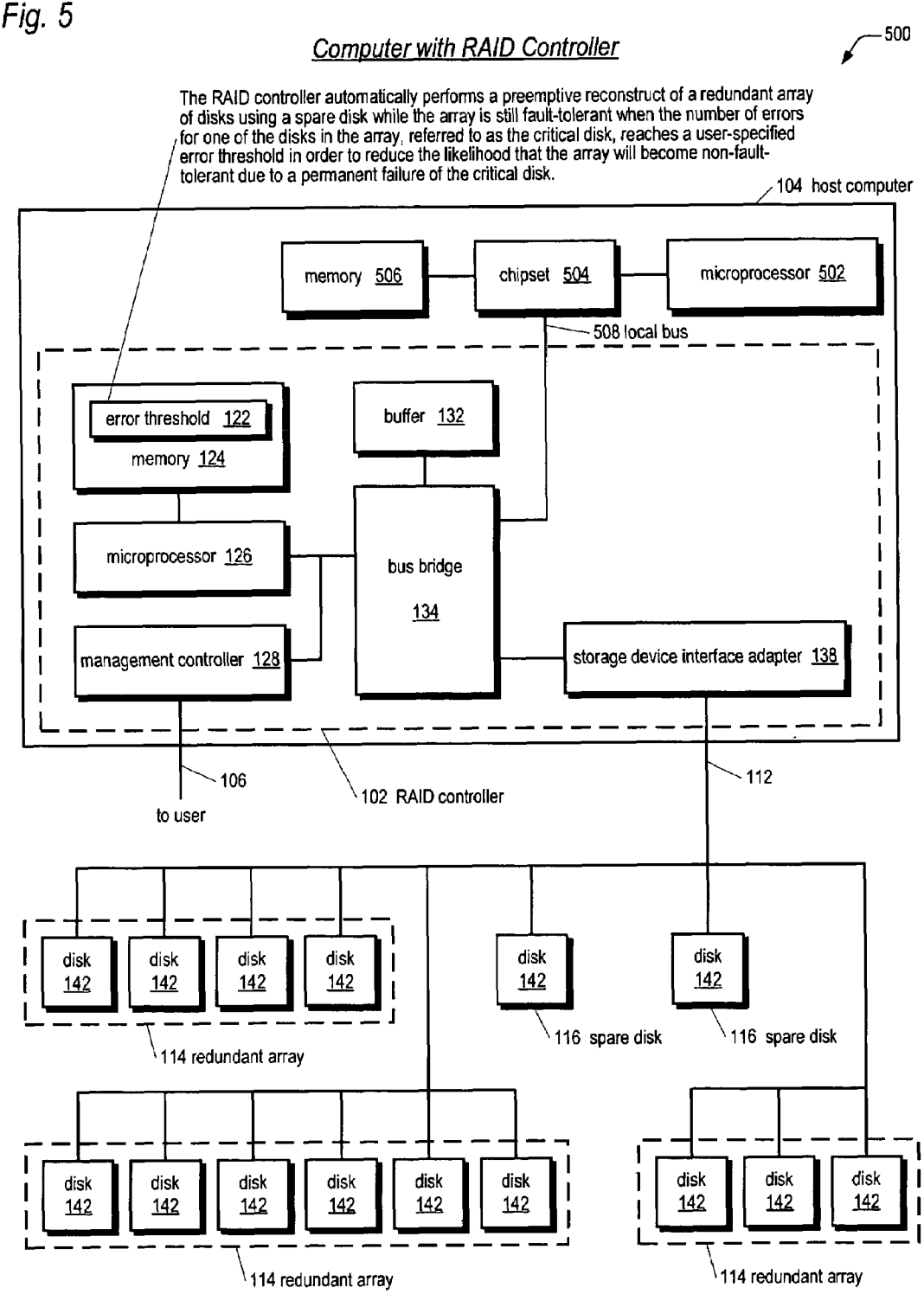
FIG. 5 is a computer system including a RAID controller according to an alternate embodiment of the present invention.

Referring now to FIG. 5, a computer system 500 including a RAID controller 102 according to an alternate embodiment of the present invention is shown. FIG. 5 is similar to FIG. 1 and like number elements are alike. However, in the embodiment of FIG. 5, the RAID controller 102 comprises a host bus adapter type RAID controller included in the host computer 104. The host computer 104 includes a microprocessor 502 and a memory 506 each coupled to a chipset 504. The microprocessor 502 executes programs stored in the memory 506, such as an operating system, utilities, and application programs that access data on the redundant arrays 114 via the RAID controller 102. The chipset 504 provides a local bus 508 by which the RAID controller 102 is coupled to the microprocessor 502 and memory 506 to enable the RAID controller 102 to transfer data between the memory 506 and itself, and to enable the microprocessor 502 to issue I/O requests to the RAID controller 102. The local bus 508 may include but is not limited to a PCI, PCI-X, CompactPCI, or PCI Express bus. In one embodiment, the RAID controller 102 is integrated onto a motherboard of the host computer 104. In another embodiment, the RAID controller 102 comprises an add-in controller card that plugs into a slot of local bus 508. The RAID controller 102 of FIG. 5 is configured to perform a preemptive reconstruct according to the present invention as described herein.

In one embodiment, the RAID controller 102 performs a manual preemptive reconstruct of the redundant array 114 rather than an automatic preemptive reconstruct. That is, rather than automatically performing the preemptive reconstruct in response to block 212 without user input, the RAID controller 102 performs the preemptive reconstruct of FIG. 2, 3, or 4 beginning at block 214 in response to user input. The user provides input specifying the critical disk 142 in the redundant array 114, and the RAID controller 102 performs the remaining steps of the preemptive reconstruct in response to the user input. In one embodiment, when the RAID controller 102 determines at block 212 that the critical disk 142 has reached its critical error threshold 122, the RAID controller 102 notifies the user of the condition, and the user responsively provides input to initiate the manual preemptive reconstruct of the redundant array 114.

Figure 6:
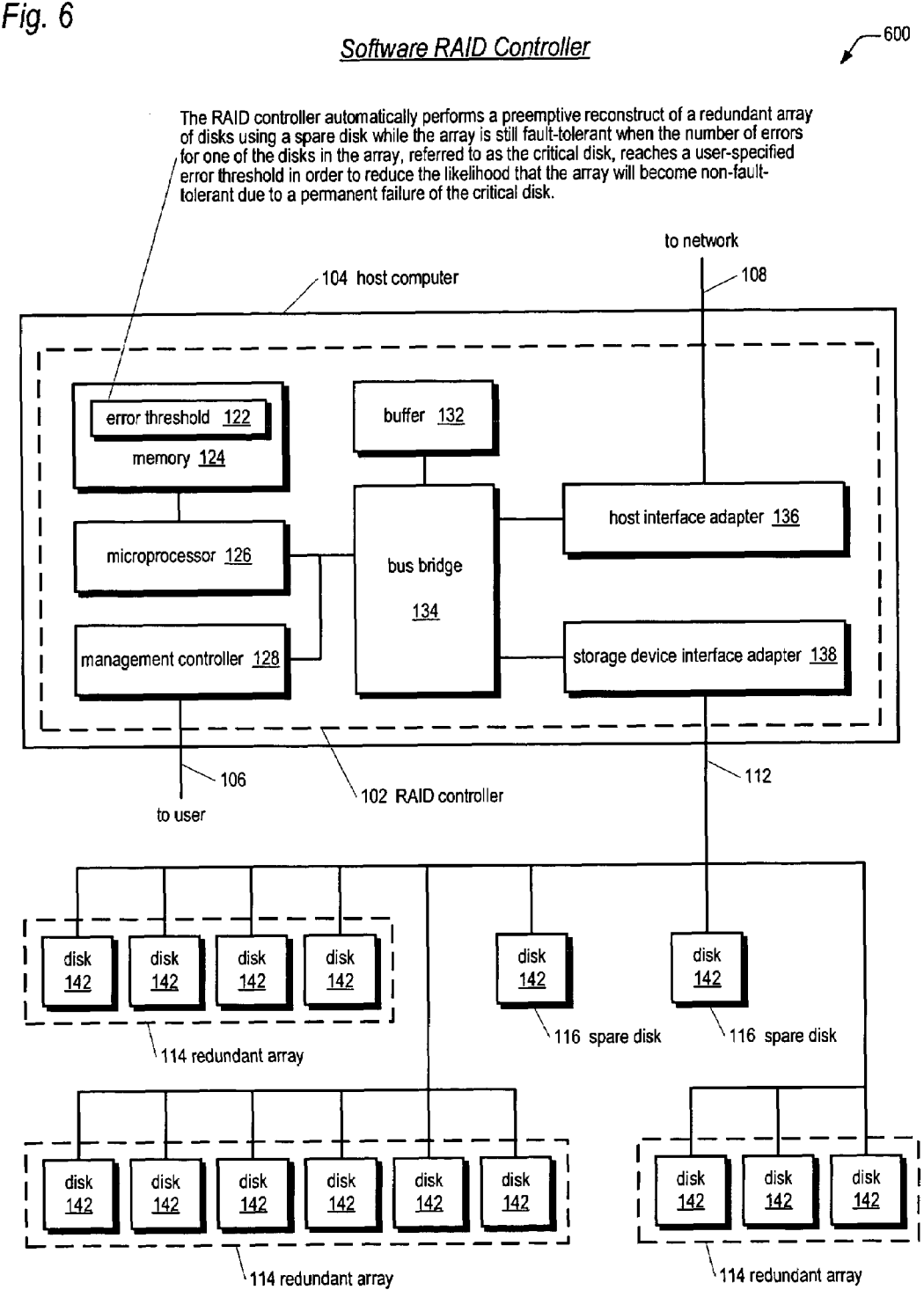
FIG. 6 is a software RAID controller according to an alternate embodiment of the present invention.

Referring now to FIG. 6, a software RAID controller 102 according to an alternate embodiment of the present invention is shown. FIG. 6 is similar to FIG. 1 and like number elements are alike. However, in the embodiment of FIG. 6, the RAID controller 102 is comprised of components of the host computer 104, commonly referred to as a software RAID controller. In the RAID controller 102 of FIG. 6, the host interface adapter 136 interfaces to a network of computers other than the host computer 104. In the embodiment of FIG. 6, the microprocessor 126 of the RAID controller 102 may comprise the microprocessor of the host computer 104, the memory 124 and buffer 132 of the RAID controller 102 may comprise the system memory of the host computer 104, the storage device interface adapter 138 of the RAID controller 102 may comprise one or more host bus adapters of the host computer 104, the bus bridge 134 may comprise a chipset of the host computer 104, and the host interface adapter 136 may comprise a network interface card of the host computer 104. The error threshold 122 may be stored in the main memory 124 of the host computer 104. In particular, the program instructions for performing the functions of the RAID controller 102 may be part of the operating system and/or system firmware, such as a ROM BIOS. The microprocessor 126 executes the program instructions to perform the RAID controller 102 functions, and in particular to perform a preemptive reconstruct of a disk 124 that has reached its error threshold 122, as described herein.

Although embodiments have been described in which the arrays of disks are redundant, another embodiment is contemplated in which a preemptive reconstruct of a non-redundant array of disks is performed. In particular, the preemptive reconstruct may be performed on a RAID level 0 array of disks. RAID level 0 provides striping of data across a plurality of disks, but is not a redundant RAID level, since no redundant data is written to the array. However, once a disk in the array reaches the error threshold, the data may be copied from the critical disk to a spare disk, and then the critical disk could be replaced in the striped array with the spare disk which now contains a copy of the critical disk. Furthermore, although embodiments have been described with reference to RAID levels that employ mirroring and parity redundancy, a preemptive reconstruct may also be performed on redundant disk arrays that employ other data redundancy techniques, such as RAID 2 which uses Hamming code, or error correcting code (ECC), redundancy.

Also, although the present invention and its objects, features and advantages have been described in detail, other embodiments are encompassed by the invention. In addition to implementations of the invention using hardware, the invention can be implemented in computer readable code (e.g., computer readable program code, data, etc.) embodied in a computer usable (e.g., readable) medium. The computer code causes the enablement of the functions or fabrication or both of the invention disclosed herein. For example, this can be accomplished through the use of general programming languages (e.g., C, C++, JAVA, and the like); GDSII databases; hardware description languages (HDL) including Verilog HDL, VHDL, Altera HDL (AHDL), and so on; or other programming and/or circuit (i.e., schematic) capture tools available in the art. The computer code can be disposed in any known computer usable (e.g., readable) medium including semiconductor memory, magnetic disk, optical disk (e.g., CD-ROM, DVD-ROM, and the like), and as a computer data signal embodied in a computer usable (e.g., readable) transmission medium (e.g., carrier wave or any other medium including digital, optical or analog-based medium). As such, the computer code can be transmitted over communication networks, including Internets and intranets. It is understood that the invention can be embodied in computer code and transformed to hardware as part of the production of integrated circuits. Also, the invention may be embodied as a combination of hardware and computer code.

Finally, those skilled in the art should appreciate that they can readily use the disclosed conception and specific embodiments as a basis for designing or modifying other structures for carrying out the same purposes of the present invention without departing from the spirit and scope of the invention as defined by the appended claims.

I claim:

1. A method for performing a preemptive reconstruct of a redundant array of disks while the redundant array is still fault-tolerant, the method comprising:
   determining that a number of errors by one of the disks in the redundant array has exceeded an error threshold;
   reading data from a second one of the disks in the redundant array and writing the data to a spare disk, in response to said determining, wherein the data of the second one of the disks in the redundant array is a mirrored copy of data of the one of the disks;
   replacing the one of the disks in the redundant array with the spare disk, after said reading and writing is complete; and
   while said reading and writing, writing second data to the one of the disks in the redundant array in response to a user write request including the second data, thereby maintaining the fault-tolerance of the redundant array.

2. The method of claim 1, further comprising:
   writing the second data also to the spare disk if a destination of the second data is to a location previously written to the spare disk by said reading and writing.

3. A method for performing a preemptive reconstruct of a redundant array of disks while the redundant array is still fault-tolerant, the method comprising:
   determining that a number of errors by one of the disks in the redundant array has exceeded an error threshold;
   creating the data of the one of the disks from second data read from two or more of the other disks in the redundant array and writing the created data to a spare disk, in response to said determining;
   replacing the one of the disks in the redundant array with the spare disk, after said creating and writing is complete; and
   while said creating and writing, writing third data to the one of the disks in the redundant array in response to a user write request including the third data, thereby maintaining the fault-tolerance of the redundant array.

4. The method of claim 3, wherein said creating the data comprises:
   reading the second data from the two or more of the other disks in the redundant array; and
   performing a binary exclusive-OR of the second data to generate the data of the one of the disks.

5. The method of claim 3, further comprising:
   writing the third data also to the spare disk if a destination of the third data is to a location previously written to the spare disk by said creating and writing.

6. A RAID controller for performing a preemptive reconstruct of a redundant array of disks while the redundant array is still fault-tolerant, comprising:
   a memory, for storing an error threshold; and
   a microprocessor, coupled to said memory, configured to:
      determine that a number of errors by one of the disks in the redundant array has exceeded the error threshold;
      read data from a second one of the disks in the redundant array and write the data to a spare disk, in response to determining that the number of errors exceeded the error threshold, wherein the data of the second one of the disks in the redundant array is a mirrored copy of data of the one of the disks;
      replace the one of the disks in the redundant array with the spare disk, after the reading of the data and the writing of the data to the spare disk is complete; and
      while performing the reading and writing, write second data to the one of the disks in the redundant array in response to a user write request including the second data, thereby maintaining the fault-tolerance of the redundant array.

7. The RAID controller of claim 6, wherein the microprocessor is further configured to:
   write the second data also to the spare disk if a destination of the second data is to a location previously written to the spare disk by the reading and writing.

8. A RAID controller for performing a preemptive reconstruct of a redundant array of disks while the redundant array is still fault-tolerant, comprising:
   a memory, for storing an error threshold; and
   a microprocessor, coupled to said memory, configured to:
      determine that a number of errors by one of the disks in the redundant array has exceeded the error threshold;
      create the data of the one of the disks from second data read from two or more of the other disks in the redundant array and write the created data to a spare disk, in response to determining that the number of errors exceeded the error threshold;
      replace the one of the disks in the redundant array with the spare disk, after the creating of the data and the writing of the created data to the spare disk is complete; and
      while performing the creating and writing, write third data to the one of the disks in the redundant array in response to a user write request including the third data, thereby maintaining the fault-tolerance of the redundant array.

9. The RAID controller of claim 8, wherein in order to create the data, the microprocessor is configured to:
   read the second data from the two or more of the other disks in the redundant array; and
   perform a binary exclusive-OR of the second data to generate the data of the one of the disks.

10. The RAID controller of claim 8, the microprocessor is configured to:
   write the third data also to the spare disk if a destination of the third data is to a location previously written to the spare disk by the creating and writing.

* * * * *